US008328042B2

(12) United States Patent
Canty et al.

(10) Patent No.: US 8,328,042 B2
(45) Date of Patent: Dec. 11, 2012

(54) VESSEL PORT CONFIGURED FOR USE WITH A GLOVE BAG

(75) Inventors: Thomas M. Canty, Williamsville, NY (US); Richard Marinelli, Tonawanda, NY (US)

(73) Assignee: J.M. Canty, Inc., Buffalo, NY (US)

( * ) Notice: Subject to any disclaimer, the term of this patent is extended or adjusted under 35 U.S.C. 154(b) by 852 days.

(21) Appl. No.: 12/353,771

(22) Filed: Jan. 14, 2009

(65) Prior Publication Data

US 2010/0176132 A1 Jul. 15, 2010

(51) Int. Cl.
*B65D 25/54* (2006.01)
*B65D 43/26* (2006.01)
*B65D 51/00* (2006.01)
*H02G 3/14* (2006.01)

(52) U.S. Cl. ......... 220/663; 220/242; 220/263; 220/377

(58) Field of Classification Search ...... 312/1; 220/377, 220/336, 316, 263, 262, 242; 277/390, 392, 277/393

See application file for complete search history.

(56) References Cited

U.S. PATENT DOCUMENTS 2,736,937 A * 3/1956 Knapp .......................... 164/461
3,356,254 A * 12/1967 Becker .............................. 312/1
3,907,389 A * 9/1975 Cox et al. .......................... 312/1
4,089,571 A * 5/1978 Landy ............................... 312/1
4,111,808 A * 9/1978 Fair ............................... 210/197
4,746,178 A * 5/1988 Canty ........................... 362/576
4,809,862 A * 3/1989 Canty ........................... 220/663
5,141,125 A * 8/1992 Canty et al. ................... 220/820
5,672,168 A * 9/1997 de la Torre et al. ............... 606/1
6,359,742 B1 * 3/2002 Canty et al. ................... 359/894
6,485,467 B1 * 11/2002 Crook et al. .................. 604/174
6,782,184 B2 * 8/2004 Canty et al. ................... 385/138
2003/0103756 A1 * 6/2003 Canty et al. ................... 385/138
2004/0066509 A1 * 4/2004 Canty et al. ................... 356/246

* cited by examiner

*Primary Examiner* — Mickey Yu
*Assistant Examiner* — Kaushikkumar Desai
(74) *Attorney, Agent, or Firm* — Leydig, Voit & Mayer, Ltd.

(57) ABSTRACT

A port and closure device for a vessel that is configured for use with a glove bag. The port comprising includes a first annular flange with an opening, a second annular flange disposed a predetermined distance from the first flange and also having an opening, and a seal ring disposed adjacent the first annular flange and having an additional opening. At least a portion of the openings are aligned so that a path is provided through the flanges and the seal ring. A slideable door is included in the port between the seal ring and the second annular flange. The slideable door has a first position that obstructs the path and a second position that is outside of the path. Springs are disposed between the first flange and the seal ring that urge the seal ring toward the slideable door. To reduce contamination sites, the springs may be sealed within an annular interface between the first annular flange and the seal ring. Alternatively, or in addition, a funnel pipe may be used with the port disposed in the openings of the first and second flange and the seal ring. The port may also include an adapter configured to hold a glove bag thereon.

20 Claims, 8 Drawing Sheets

VESSEL PORT CONFIGURED FOR USE WITH A GLOVE BAG

FIELD

The present invention relates to sealed ports for providing access to vessels.

BACKGROUND

In certain industries, production processes and testing are carried out inside sealed vessels. The vessels may be held under specific pressure or temperature, or may contain a specific gas, liquid or solid. For example, a process may occur at an elevated or reduced temperature, at an elevated or reduced pressure and/or in the presence of an ambient gas. In some cases the contents inside the vessel may be delicate or sensitive and cannot be subject to contact with particles in the ambient environment. On the other hand, contents inside the vessel may be hazardous and must be contained within the vessel. Nonetheless, in some instances, access of the contents of the vessel may be necessary during the process or testing. Accordingly, a wall of the vessel may include an opening allowing access to the inside during the process or testing.

In many instances the opening to a vessel is a complex valve that prevents leakage from or into the vessel. Many valves include intricate parts and small crevices, such as threading, which gather material during a process or testing. Frequently, despite best efforts, the material is not entirely removed from these parts or crevices. As a result, such parts and crevices become contamination sites. A small contamination site holding material from a prior process or test in the vessel can jeopardize the next test or process entirely. Accordingly, it is desirable that an opening into a vessel be limited in its number of potential contamination sites.

SUMMARY

The present invention provides a port and closure device for a vessel that is configured for use with a glove bag. The port comprising includes a first annular flange with an opening, a second annular flange disposed a predetermined distance from the first flange and also having an opening, and a seal ring disposed adjacent the first annular flange and having an additional opening. At least a portion of the openings are aligned so that a path is provided through the flanges and the seal ring. A slideable door is included in the port between the seal ring and the second annular flange. The slideable door has a first position that obstructs the path and a second position that is outside of the path. Springs are disposed between the first flange and the seal ring that urge the seal ring toward the slideable door. To reduce contamination sites, the springs may be sealed within an annular interface between the first annular flange and the seal ring. Alternatively, or in addition, a funnel pipe may be used with the port disposed in the openings of the first and second flange and the seal ring. The port may also include an adapter configured to hold a glove bag thereon.

BRIEF DESCRIPTION OF THE DRAWINGS

Exemplary embodiments of the invention are described in the following with respect to the drawings, in which.

DETAILED DESCRIPTION

Figure 1:
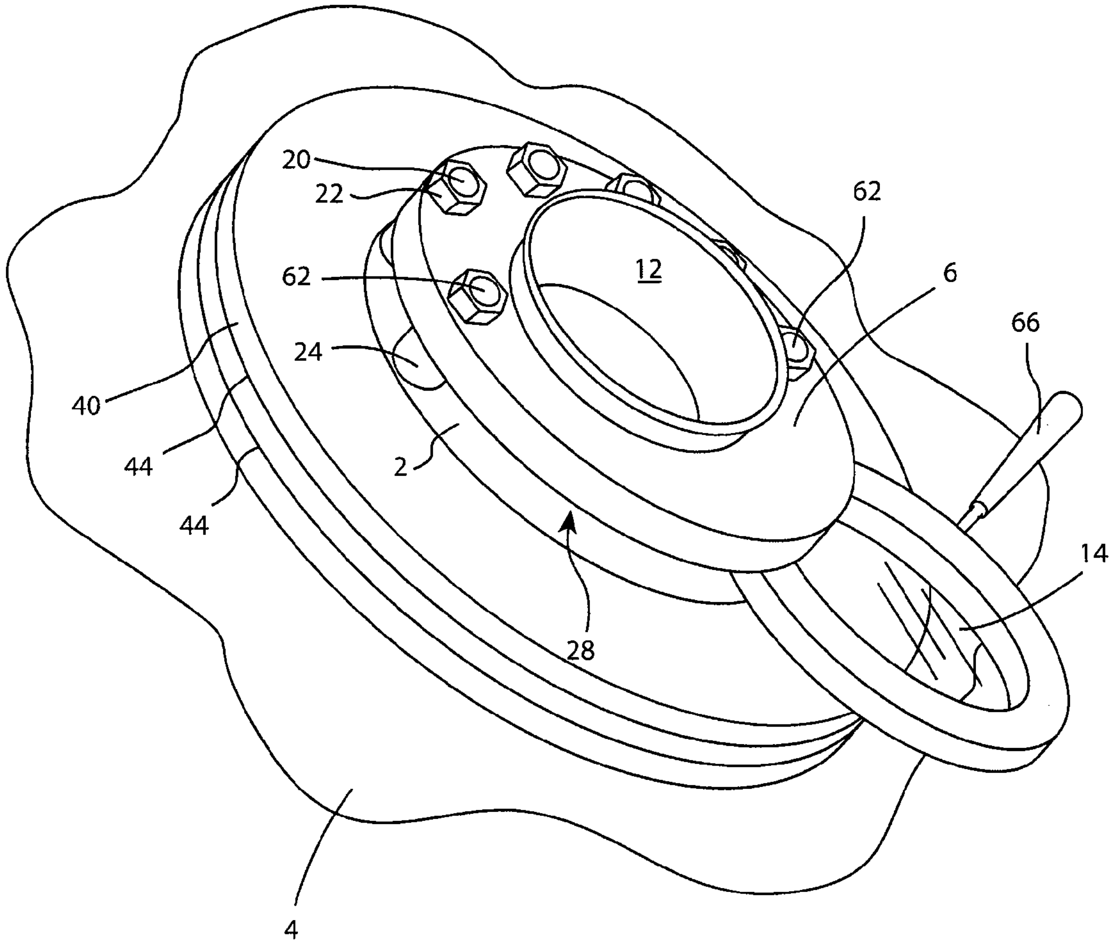
FIG. 1 shows a perspective view of an embodiment of a port closure device in accordance with the invention.
Figure 2:
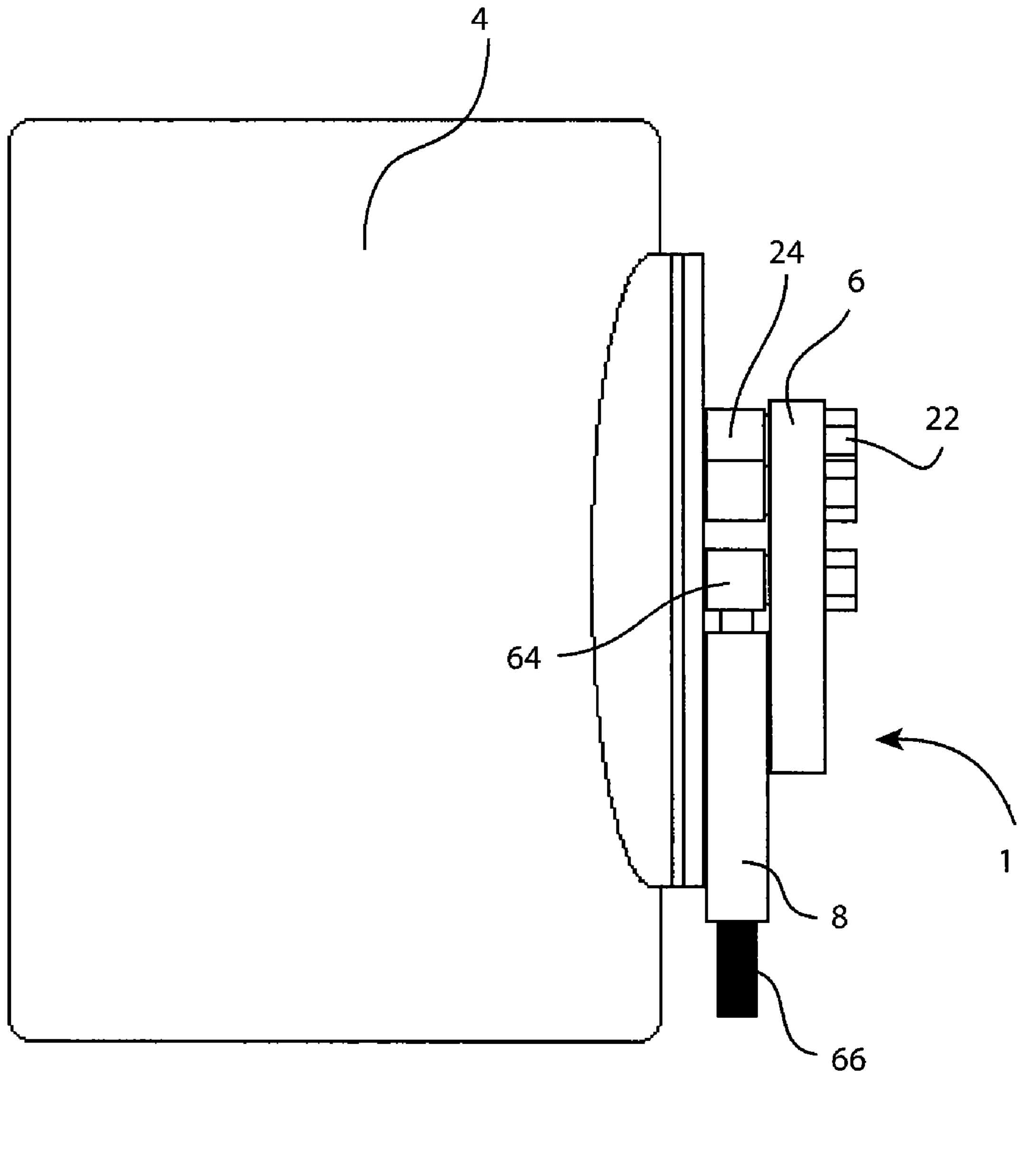
FIG. 2 shows a side view of the port closure device of FIG. 1 on a vessel.
Figure 3:
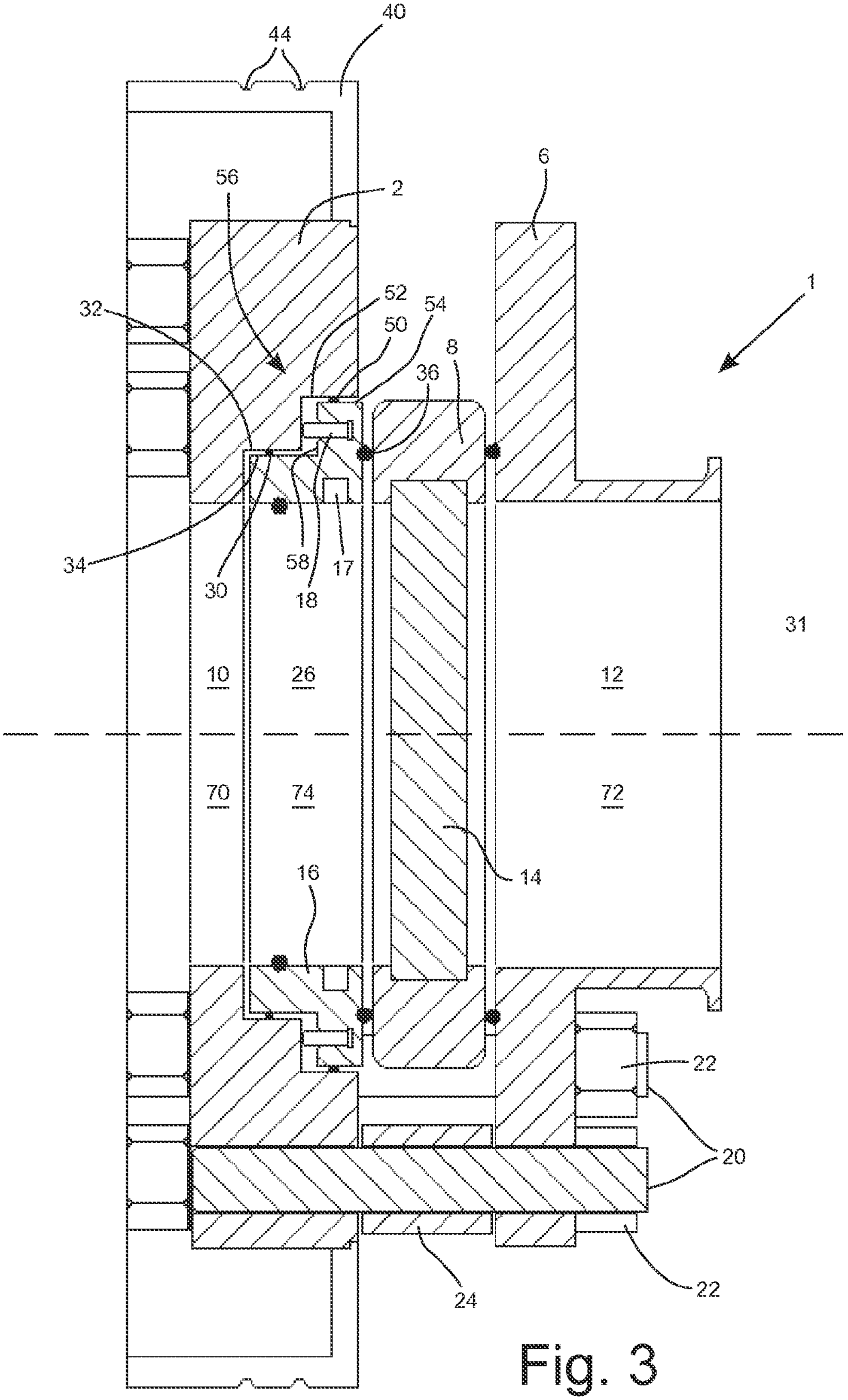
FIG. 3 shows a cross section of the port closure device of FIG. 1.

FIGS. 1-3 show an embodiment of a port closure device 1 in accordance with the present invention. The illustrated port closure device is positioned over an opening in a vessel 4 and provides access to the vessel 4. The port closure device 1 includes a base ring 2 that is in the form of an inner flange and is fixedly attached to the vessel 4. An outer flange 6 is secured at a predetermined distance from the base ring 2 away from the vessel with respect to an axial direction of the port closure device 1. Each of the base ring 2 and outer flange 6 have an opening 10, 12 providing an access path into the vessel. The port closure device also includes a slideable door 8 that can be moved from a first position, in which it is disposed between the base ring 2 and outer flange 6 so as to block the access path, to a second position, in which it is substantially outside of the base ring 2 and outer flange 6. The slideable door 8 is shown in the first position in FIG. 3 and is shown in the second position in FIG. 1. The slideable door 8 can include a wall 14 which allows the port closure device 1 to be closed when the slideable door 8 is disposed between the base ring 2 and outer flange 6. When the port closure device 1 is closed access to the vessel may be prevented and the vessel 4 can be sealed off from the surrounding environment. A seal ring 16 is pushed toward the slideable door 8 by one or more spring elements 18 to promote a secure seal between the inside of the vessel and the outer environment. Similar to base ring 2 and outer flange 6, the seal ring 16 also includes an opening 26 so that the vessel 4 may be accessed through the access path when the slideable door 8 is moved into the second position. In the illustrated embodiments of the invention, the seal ring 16 is shown adjacent to the base ring 2 and the slideable door 8 is adjacent to the outer flange 6. However, in an alternative embodiment of the invention, the seal ring 16 may be disposed adjacent to the outer flange 6 and may push the slideable door 8 toward the base ring 2.

The base ring 2 is secured to the outer flange 6 using a series of studs 20 that are held in place with nuts 22. Alternatively, other attachment devices may be used to fix the base ring 2 or inner flange with respect to the outer flange 6, for example bolts. In the illustrated embodiment, spacers 24 are included surrounding the studs 20 to hold the second flange 6 at the predetermined distance from the base ring 2. Alternatively, the spacer 24 could be integrally connected with the stud 20. The studs 20 are disposed around only a portion of the base ring 2 and outer flange 6 at spaced intervals. Accordingly, a slot 28 between the studs 20 allows the slideable door 8 to be moved into and out of the first position, thereby preventing and providing access to the vessel, respectively.

Figure 4:
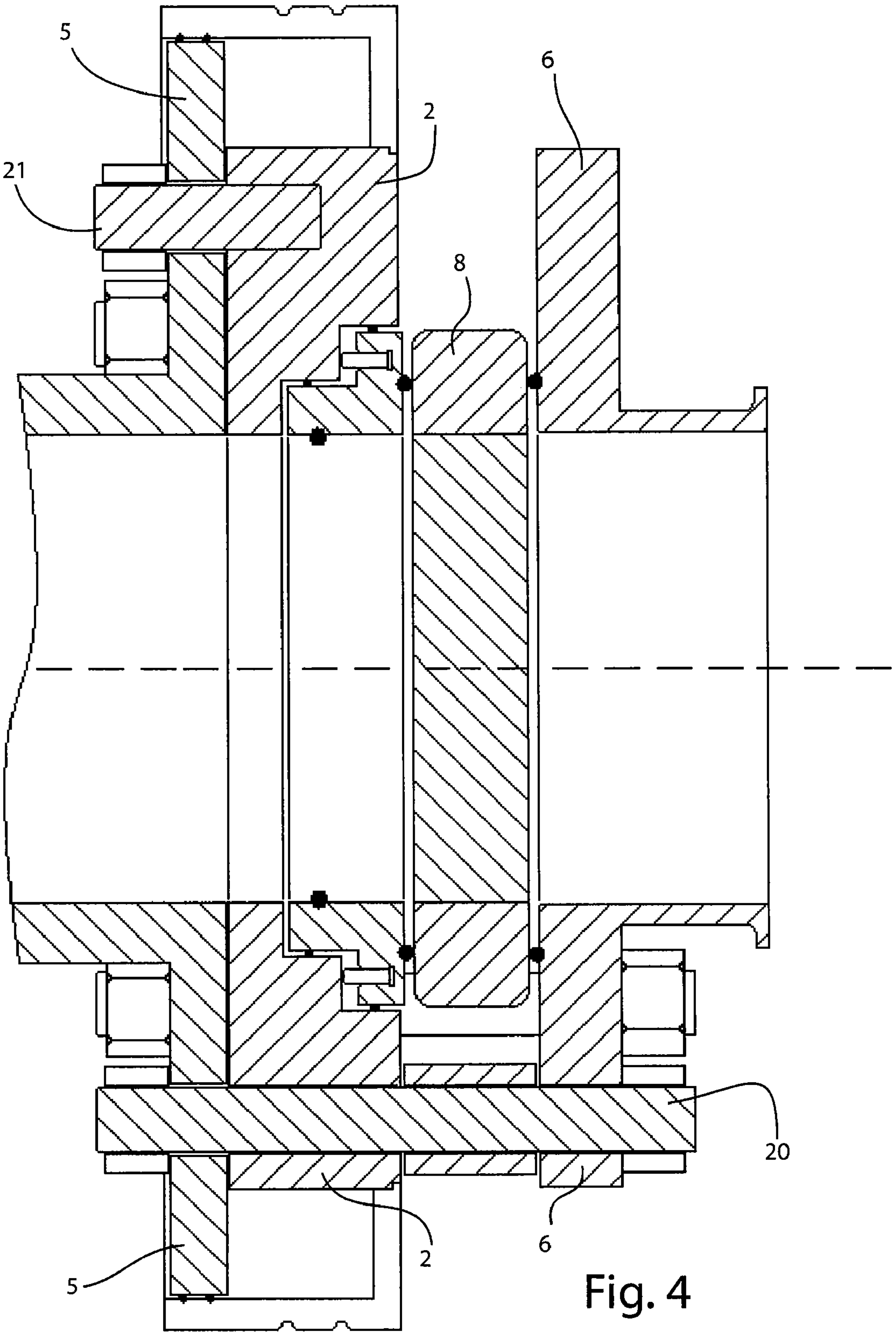
FIG. 4 shows a cross section of another embodiment of a port closure device in accordance with the invention.

The base ring 2 is secured to vessel 4 using a series of additional studs to attach the base ring 2 directly to the vessel. Alternatively, the studs 20, which secure the outer flange 6 to the base ring 2, may extend through a flange 5 of the vessel, as shown in FIG. 4. Because the studs 20 do not encircle the entire ring, in order to allow removal of the slideable door 8, short studs 21 may be used to hold the base ring 2 to the flange 5 around the remaining portion of the base ring 4.

A number of seals are included in the port closure device 1 to ensure that the cross-contamination between the contents of the vessel and surrounding environment does not occur. The base ring 2 is fixed in position on the vessel and, accordingly, the connection between the base ring 2 and the vessel 4 can be permanently sealed. An annular seal 30, such as an O-ring, is included between seal ring 16 and the base ring 2. Because the seal ring 16 is configured to move along the axis 31 of the port closure, the annular seal 30 is disposed between axially extending walls of the base ring 2 and seal ring 16. In other words, the base ring 2 includes a circumferential inner-facing seal wall 32 that is parallel to the axis 31 of the port closure, the seal ring 16 includes an outer-facing seal wall 34 that is also parallel to the axis 31 of the port closure, and the annular seal 30 is placed between the inner-facing seal wall 32 and outer-facing seal wall 34. As a result, the seal ring 16 can make slight adjustments along the port closure axis with the annular seal 30 remaining effective as the seal ring 16 moves.

Another seal 36, such as an O-ring, can be included between the seal ring 16 and the slideable door 8. This door seal 36 prevents contamination across the connection between these pieces. Both the door seal 36, the annular seal 30 and other seals described below may take on a variety of forms. In one embodiment, the seals may be in the form of an O-ring fixed in a groove in an adjacent element. Alternatively, the seal can be formed by a rubber or plastic band, epoxy fixed to an adjacent element or other methods used for sealing adjacent members. In addition, the port closure can include more than one type of seal.

If the slideable door 8 includes wall 14, as shown in FIGS. 1 and 3, the annular seal 30 and door seal 36 will effectively seal off the contents of the vessel 4 from the surrounding environment. The distance between the inner-facing seal wall 32 and outer-facing seal wall 34 is designed such that it does not vary and thus, the annular seal 30 always provides an effective seal. In contrast, the seal ring 16 can move, and thus a gap could occur between the seal ring 16 and slideable door 8, thereby cross contaminating the vessel contents and surrounding environment. However, the springs 18 push seal ring 16 against slideable door 8 so that the door seal 36 remains effective. If the contents of the vessel are at ambient pressure or under elevated pressure, the springs 18 push the seal ring 16 so that slideable door 8 is tightly wedged between seal ring 16 and outer flange 6. Thus, door seal 36 is compressed. On the other hand, if the contents of vessel 4 are under vacuum, the vacuum produces a force on the surface area of wall 14 to pull slideable door 8 against seal ring 16. As a result, door seal 36 is again compressed, thereby producing an effective seal.

The annular seal 30 is disposed on an interior side of spring 18 with respect the contents of the vessel. In other words the annular seal 30 is disposed between the interior of the vessel and spring 18. Accordingly, annular seal 30 will prevent the contents of vessel 4 from coming into contact with spring 18. Because spring 18 is subject to having small intricate parts and crevices, such as threads, it may serve as a collection sight for contaminating material. Having the annular seal 30 be on the interior side of spring 18 relative to the vessel interior prevents the spring 18 from becoming a contamination sight.

Figure 5:
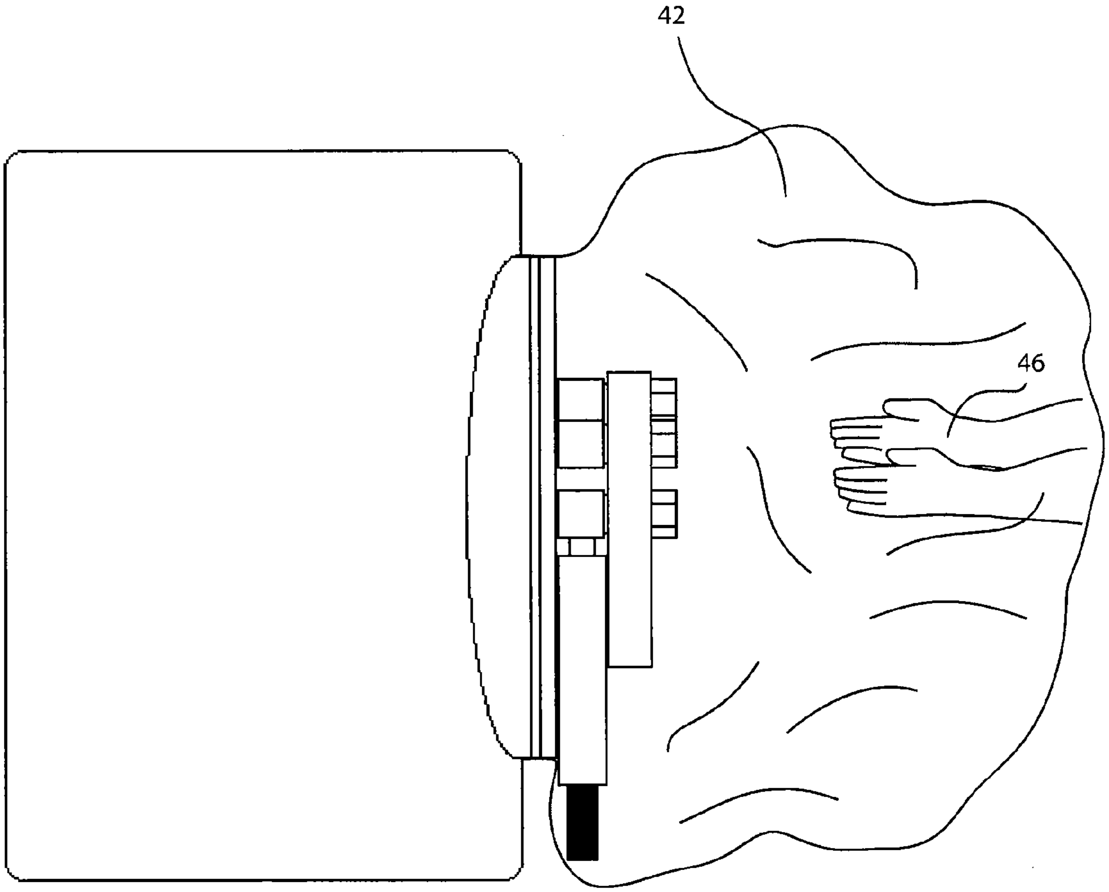
FIG. 5 shows a side view of an embodiment of a port closure device in accordance with the invention with a glove bag attached thereto.

The port closure device 1 can include an adapter 40 disposed around base ring 2 to hold an accessory or module providing additional function. For example, the adapter 40 may be in the form of a ring configured to receive a glove bag 42, as shown in FIG. 5. The illustrated adapter 40 includes at least one annular groove 44 that hold a seal when attaching the glove bag 42 to the port closure device. The seal can be integrally formed with the glove bag 42 or can be a separate element. For example, the seal could be part of an elastic opening in the glove bag 42 providing a mounting ring which is stretched around the adapter 40. In such a case, the glove bag 42 would be configured to hold itself in place. Alternatively, one or more fasteners can be used to hold the glove bag 42 on the adapter. For instance, a clamp in the form of a mounting ring could wrap around the adapter with the glove bag 42 disposed therebetween. The clamp could then be tightened onto the adapter to both hold and seal the glove bag 42 on the port closure device 1.

The addition of a glove bag 42 to the port closure device 1 allows the vessel 4 to be accessed without introducing the contents of the vessel to the surrounding environment or, on the other hand, subjecting the contents of the vessel to the conditions of the surrounding environment. At least a portion of the glove bag 42 may be transparent so that a user can see the contents within the vessel while using the glove bag 42. The glove bag 42 can be formed of a single material, for example a transparent plastic. Alternatively, the glove portions 46 of glove bag 42 may be formed of a different material than the bag portion. In such a case, the glove portions 46 can be integrally formed with the bag portion, can be adhesively attached to the bag portion or can be attached to the bag portion using a mechanical attachment device, such as clamps. The shown glove bag 42 includes glove portions 46, as discussed above, that are in the shape of a hand, allowing a user to easily manipulate the contents of the vessel. However, the glove bag 42 could be flexible enough that a user could manipulate the contents of the vessel through any portion of the bag, such that the glove bag 42 needs no predefined glove portions.

If the contents of the vessel and the conditions of the vessel so require, the glove bag 42 can be attached to the port closure device 1 in a manner to minimize cross contamination between the vessel and the surrounding environment and maximize safety. Prior to opening the closure, the outside of the port closure device 1 and the inside of the glove bag 42 may each be sterilized. If the vessel is under pressure or vacuum, it may be returned to ambient pressure before opening the closure. The glove bag 42 can be placed on the adapter 40 either before or after adjusting the vessel pressure. The pressure of the vessel can be adjusted through a portal in the port closure device 1 itself or through a separate opening in the vessel. As an additional safety precaution, the port closure device 1 may be configured such that it is not easy to open when there is a pressure differential between the inside of the vessel and the surrounding environment. This provides a distinct advantage over other vessel openings, which typically may be opened regardless of a pressure differential between the vessel and the surrounding environment, because the glove bag 42 is susceptible to damage if opened while the vessel is under pressure. Further, any damage of the glove bag could result in contamination of the vessel contents, thereby rendering the glove bag useless.

Figure 6:
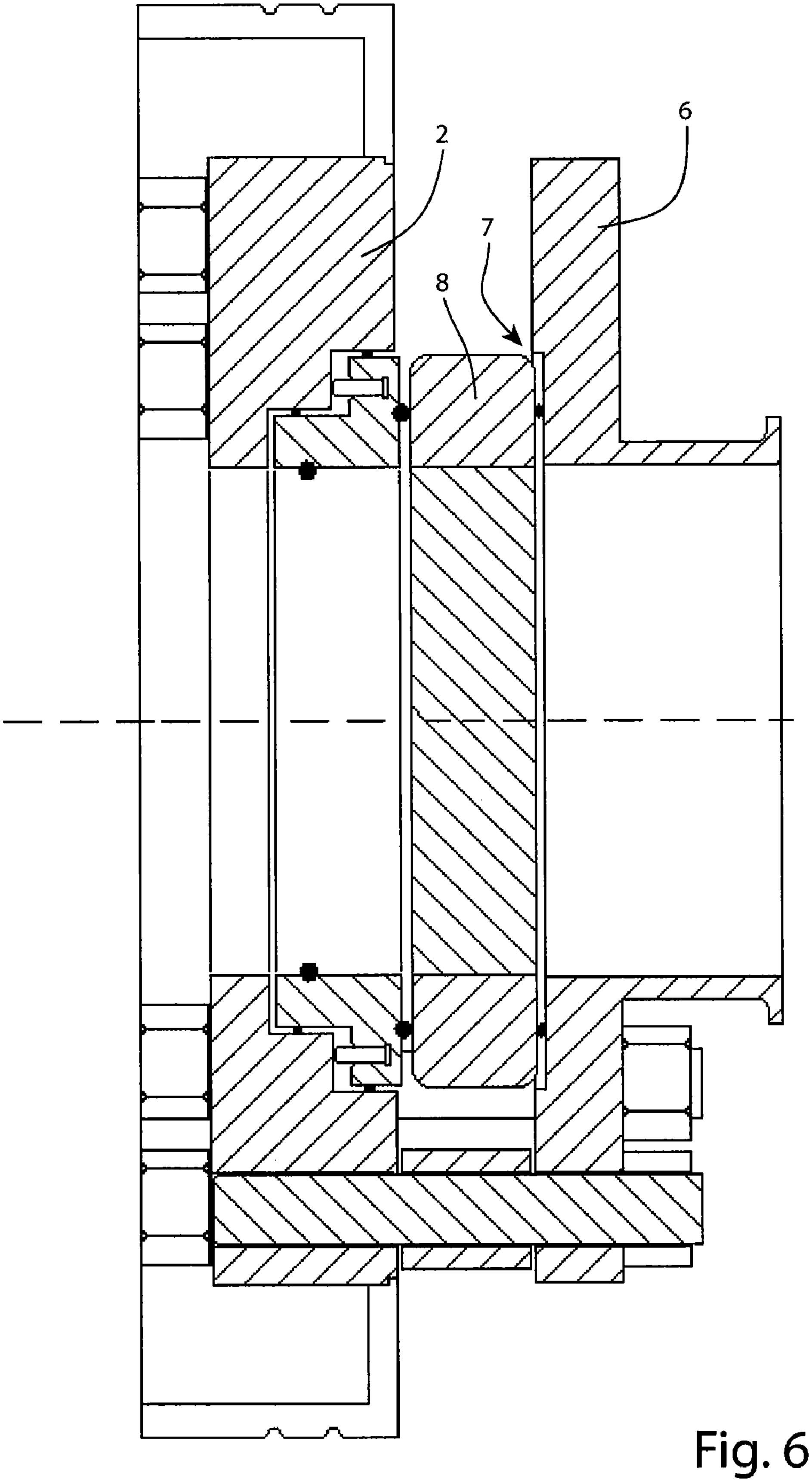
FIG. 6 shows another embodiment of a port closure device in accordance with the invention.

Depending on the force exerted by the spring plungers 18, the configuration shown in FIG. 3 can be difficult to open as a result of increased friction between the slideable door 8 and the other components of the port closure device if the vessel is under increased or decreased pressure. If the vessel 4 is pressurized, the slideable door 8 is pushed outward and friction between the slideable door and the outer flange 6 is increased. On the other hand, if the vessel 4 is under vacuum the large surface area of the slideable door 8 results in the door 8 being pulled against the seal ring 16 causing increased friction therebetweeen. As a further precaution to avoid the slideable door from being removed, the outer flange 6 may include a recessed section 7, as shown in FIG. 6. If the vessel 4 is under pressure, the slideable door 8 will be pushed into the recessed section 7 thereby preventing movement of the slideable door.

Use of glove bag 42 allows a. controlled environment in the vessel 4 to be extended to an area outside the port closure device 1, i.e. within the glove bag 42. It is foreseeable that users will want to use the glove bag 42 over an extended period of time. Therefore, the outside of the port closure device 1, shown in FIG. 3, is constructed with similar contamination considerations as the inside of the port closure device 1. For example, the springs 18 are sealed from the outside environment with a second annular seal 50. Similar to annular seal 30, annular seal 50 may be disposed between two seal walls 52, 54 that are parallel to the axis of the port closure device. This allows seal 50 to be effective even as seal ring 16 moves along the axis. By using both first and second annular seals 30, 50, the springs 18 are sealed within an annular interface region 56 between the seal ring 16 and the base ring 2. The springs 18 are thus protected from both the interior and exterior sides with respect to the vessel, by interior seal 30 and exterior seal 50 respectively. The illustrated springs 18 are in the form of threaded spring plungers that are fixed in the surface of an interface wall 58 of the seal ring 16 between the two circumferential seal walls 34, 54 of the seal ring. The spring plungers then push against an interface wall 60 of the base ring 2 disposed between its circumferential seal walls 32, 52. The interface walls 58 and 60 are both be perpendicular to the axis of the port closure device.

Figure 7:
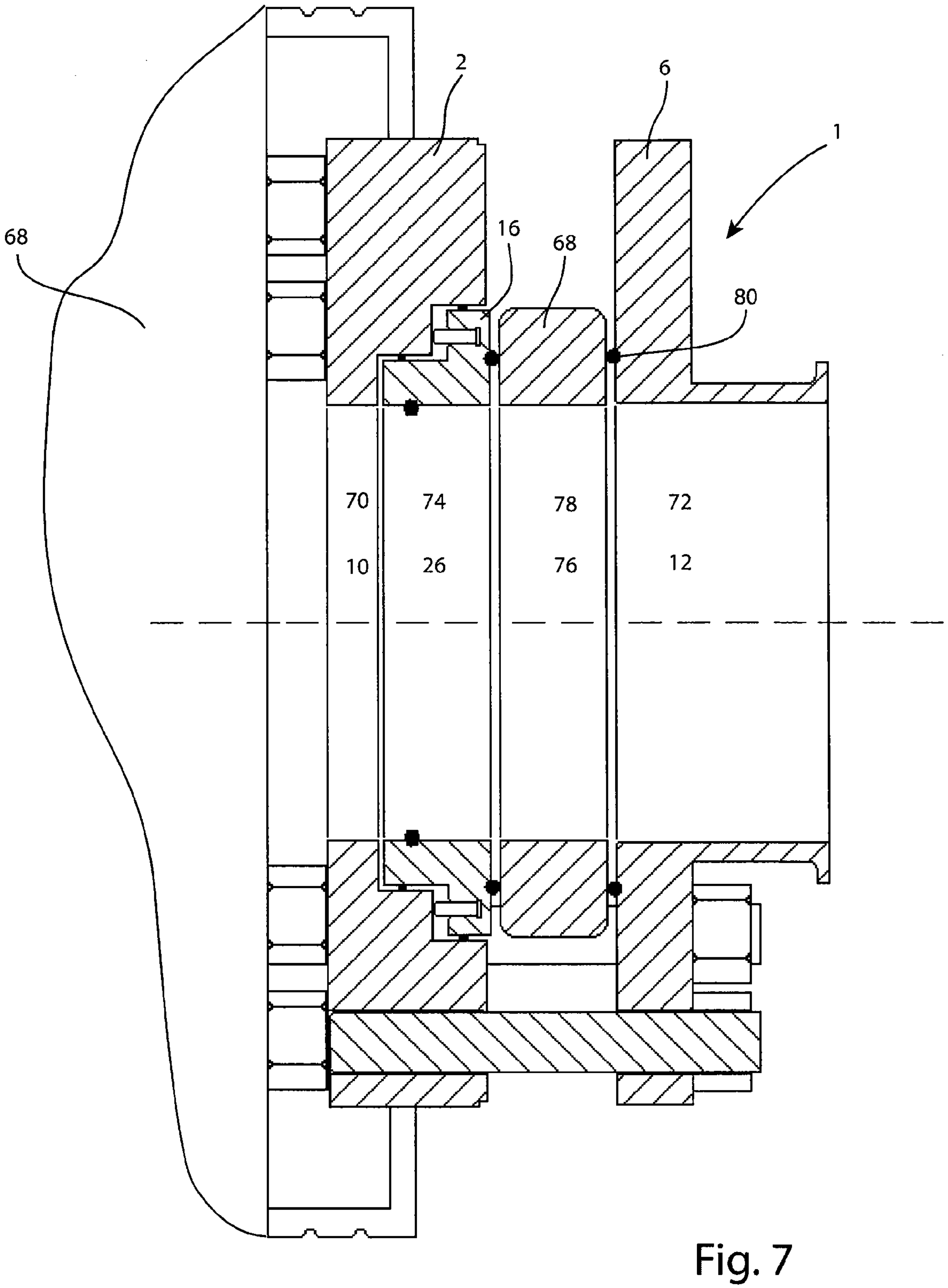
FIG. 7 shows another embodiment of a port closure device in accordance with the invention.

The slideable door 8 is pivotable about a hinge so as to move between the first position and the second position. A handle 66 is provided so that a user can easily move the slideable door 8. In the illustrated embodiment, the hinge 64 is integrally formed as one of the spacers 24. As shown, the slideable door 8 is fixedly attached to the spacer 24 which is rotatable about the stud 20 which it surrounds. Accordingly, the slideable door rotates into and out of the first and second positions. It is sensible that this spacer 24, acting as a hinge 64, would be provided on an outer stud 62 of the plurality of studs, as shown in FIG. 1. This allows the slideable door 8 to fully rotate into an out of the first and second positions. The port closure device may also include more than one slideable door 8, each providing a different function. If there are two slideable doors, each slideable door can be respectively rotatable about each of the outer studs. The different doors can provide a variety of different functions. For example, one slideable door 8 may include a wall 14 in the form of a transparent window allowing the interior of the vessel to be viewed. The window 14 can be formed of glass and held in a frame formed as an outer ring. In the illustrated embodiment, the window 14 is formed of glass that is fused to a metal outer ring of the door 8. In an alternative embodiment, the slideable door 8 can include a metal wall, such that the slideable door is formed as a single unitary structure. In another embodiment, the slideable door 8 can exclude wall 14 such that it is in the form of a slideable ring 68, as shown in FIG. 7.

If the slideable door 8 has a transparent section, or a wall 14 that is entirely transparent, it may be advantageous if the seal ring 16 includes a spray ring 17 (FIG. 3). The spray ring can be in the form of one or more nozzles disposed on an inner annular wall 74 of the seal ring 16 and configured to spray a jet of fluid toward the transparent portion of slideable door 8 when activated. The spray ring provides an easy method of cleaning the transparent portion of the slideable door 8 without having to open the port closure device 1.

To provide easy access to the vessel 4 when the port closure device 1 is open, the openings 10, 12 and 26 can be substantially aligned. Moreover each of the three openings 10, 12 and 26 can be surrounded by radially inner-facing annular walls 70, 72, 74, respectively, that are of substantially the same diameter. Thus, when the port closure device 1 is open, the three radially inner-facing annular walls 70, 72 and 74 form a seemingly uniform radially inner-facing surface through which a user can access the contents of the vessel. In the embodiment shown in FIG. 7, a slideable fill ring 68 is used to fill a gap in this surface between the outer flange 6 and the seal ring 16. The slideable fill ring 68 also includes an opening 76 that has a radially inner-facing annular wall 78 that is of substantially the same diameter as radially inner-facing annular walls 70, 72 and 74. When the slideable fill ring 68 is placed in the first position, annular wall 78 is aligned with the other annular walls 70, 72 and 74, as shown. An outer flange seal 80 is disposed between the outer flange 80 and the slideable door 8 to provide a seal between the radially inner-facing uniform surface and the exterior of the port closure device 1 when the slideable door 8 is in the form of slideable fill ring 68.

Figure 8:
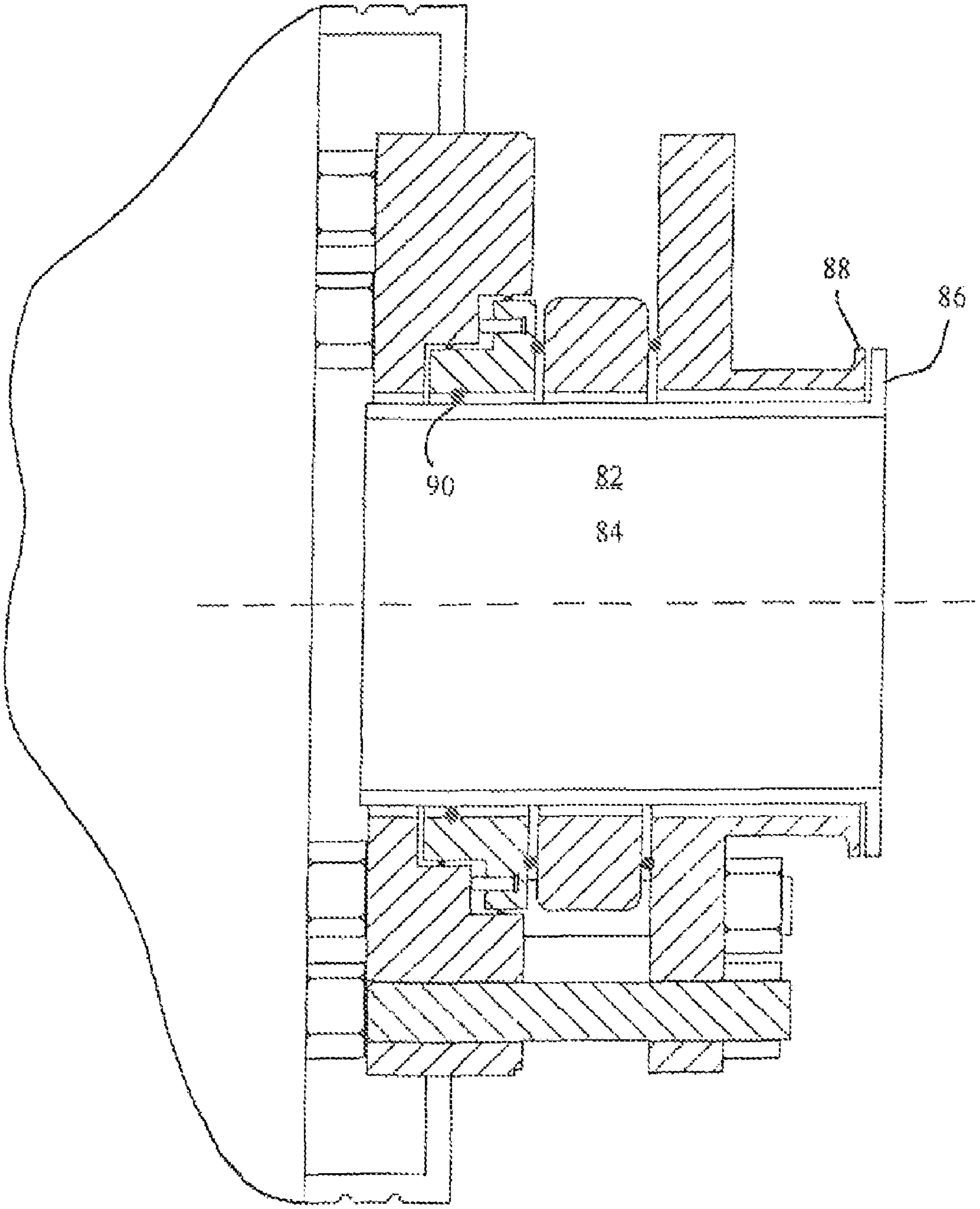
FIG. 8 shows an embodiment of a port closure device in accordance with the invention including a funnel pipe.

To provide an even more uniform surface around the openings 10, 12 and 26, a funnel pipe 82 may be inserted into the port closure device 1 when it is open, as shown in the embodiment in FIG. 8. The funnel pipe 82 provides a single uniform inner wall 84 through the port closure device 1 when it is in place. Any material passed into or out of vessel 4 is then prevented from accidentally falling into gaps in the port closure device, such as between the seal ring and base ring. To secure the funnel pipe 82 in place, it includes a projection 86 that acts cooperatively with an outer projection 88 that may be included on the outer flange 6. A clamp can be used to hold the two projections 86 and 88 together and secure the funnel pipe 82 in place. The space between the funnel pipe 82 and the openings 10, 12 and 26 can be sealed by a seal included in any of the annular walls 70, 72, 74. In FIG. 8, this seal 90 is shown adjacent to the seal ring 16.

In some cases, the contents within the vessel may be very chemically reactive. To address this, the inside of vessels are frequently made of or coated with a specific material that is appropriate for the contents of the vessel. These materials can be very expensive. In order to reduce costs, the elements of the port closure device 1 of the present invention can be made of two different materials. For example, the base ring 2 and the seal ring 16 can each have radially inner portions formed of a first material that is appropriate for contacting the contents of the vessel and radially outer portions that are made from a more common second material.

The foregoing description of exemplary embodiments is not intended to limit the scope of the invention in any way. Reference is made to the appended claim list.

We claim:

1. A port closure device for a vessel, the port closure device comprising:

a first annular flange having a first opening;

a second annular flange attached at a predetermined distance from the first annular flange, the second annular flange having a second opening;

a seal ring disposed adjacent the first annular flange and having a third opening, at least a portion of the first, second and third openings overlapping such that an access path is formed through the first annular flange, second annular flange and seal ring;

a slidable door disposed between the seal ring and the second annular flange, the slidable door having a first position obstructing the access path and a second position outside of the access path;

an annular interface region between the first annular flange and the seal ring, the annular interface region being sealed by an interior annular seal and an exterior annular seal; and at least one spring disposed within the annular interface region between the interior annular seal and exterior annular seal, the at least one spring pushing the seal ring away from the first annular flange.

2. The port closure device as recited in claim 1, wherein the first annular flange is a base ring disposed adjacent to the vessel, and the port further comprises an adapter disposed around the base ring and configured to receive a glove bag.

3. The port closure device as recited in claim 2, wherein the adapter includes at least one annular groove configured to support a seal associated with a mounting ring of the glove bag.

4. The port closure device as recited in claim 1, wherein at least a portion of the door is transparent.

5. The port closure device as recited in claim 1, wherein at least one of the first annular flange, second annular flange and seal ring has a radially inner portion made of a first, material and a radially outer portion made of a second material, the second material being different from the first.

6. The port closure device as recited in claim 1, further comprising a slideable fill ring including an opening, the slideable fill ring having a first position in which the path is within the opening and a second position in which the access path is outside of the opening, and wherein the slideable ring is coplanar with the slideable door.

7. The port closure device as recited in claim 1, wherein the first opening includes a first inner-facing annular wall, the second opening includes a second innerfacing annular wall, and the third opening includes a third inner-facing annular wall, wherein the first, second and third inner-facing annular walls are coaxial and have substantially the same diameter, and wherein at least one of the first, second and third inner-facing annular walls include a funnel seal thereon.

8. The port closure device as recited, in claim 7, wherein the outer flange includes an outer projection configured to be attached to a funnel pipe with a clamp.

9. The port closure device as recited in claim 7, further comprising a funnel extending along the first, second and third annular walls and surrounding the access path, the funnel pipe being flush with the funnel seal thereby forming a closed funnel seal.

10. The port closure device as recited in claim 8, further comprising a funnel extending along the first, second and third annular walls and surrounding the access path, the funnel pipe being flush with the funnel seal so as to form a closed funnel seal and the funnel including a connection projection configured to be clamped to the outer projection.

11. The port closure device as recited in claim 1, wherein the at least one spring includes a plurality of threaded spring plungers.

12. The port closure device as recited in claim 1, wherein the interior annular seal is disposed between a first seal wall of the first annular flange and a second seal wall of the seal ring, wherein the exterior annular seal is disposed between a third seal wall of the first annular flange and a fourth seal wall of the seal ring, and wherein the first, second, third and fourth seal walls are substantially parallel to an axial direction of the port.

13. The port closure device as recited in claim 2, further comprising a glove bag disposed on the adapter and enclosing the second annular flange therein.

14. The port closure device as recited in claim 1, wherein the seal ring includes a spray ring configured to spray a fluid toward the slideable door.

15. A device for unobtrusively accessing a vessel, the device comprising:

a port closure device including:

a base ring having a first opening, an outer flange attached at a predetermined distance from the base ring, the outer flange having a second opening, a seal ring disposed between the base ring and the outer flange and having a third opening, at least a portion of the first, second and third openings overlapping such that the base ring, outer flange and seal ring include an access path therethrough, a slideable door disposed between the base ring and the outer flange and adjacent the seal ring, the slideable door having a first position obstructing the path and a second position outside, of the access path, a plurality of springs disposed adjacent the seal ring and opposite the slideable door, the plurality of springs configured to urge the seal ring toward the slideable door, and an adapter disposed around the base ring; and a glove bag mounted to the adapter and enclosing contents of the port therein.

16. The device as recited in claim 15, wherein the seal ring is adjacent to the base ring.

17. The device as recited in claim 16, further comprising an annular interface region between the base ring and the seal ring, the annular interface region being sealed by an interior annular seal and an exterior annular seal, and wherein the springs are disposed within the annular interface region.

18. A port closure device for a vessel, the port closure device comprising:

a first annular flange having a first opening;

a second annular flange attached at a predetermined distance from the first annular flange, the second annular flange having a second opening;

a seal ring disposed adjacent the first annular flange and having a third opening, at least a portion of the first, second and third openings overlapping such that the first annular flange, second annular flange and, seal ring include an access path therethrough;

a slidable door disposed between the seal ring and the second annular flange, the slidable door having a first position obstructing the path and a second position outside of the access path;

a plurality of springs disposed between the first annular flange and the seal ring, the plurality of springs pushing the seal ring away from the first annular flange; and a funnel pipe disposed within the first, second and third openings, the funnel including a funnel opening, wherein the access path passes through the funnel opening.

19. The port closure device as recited in claim 18, wherein the base ring, first annular flange and second annular flange include respective first, second and third inner-facing annular walls, and wherein at least one of the first, second and third inner-facing annular walls includes a funnel seal configured to create a seal with the funnel pipe.

20. The port closure device as recited in claim 18, wherein the first annular flange is adjacent the vessel, and the port closure device further comprises an adapter disposed around the first annular flange, the adapter being configured to receive a glove bag.

* * * * *